Feb. 25, 1930.  G. F. WIKLE  1,748,263
TIRE BUILDING MACHINE
Filed March 19, 1924  2 Sheets-Sheet 1
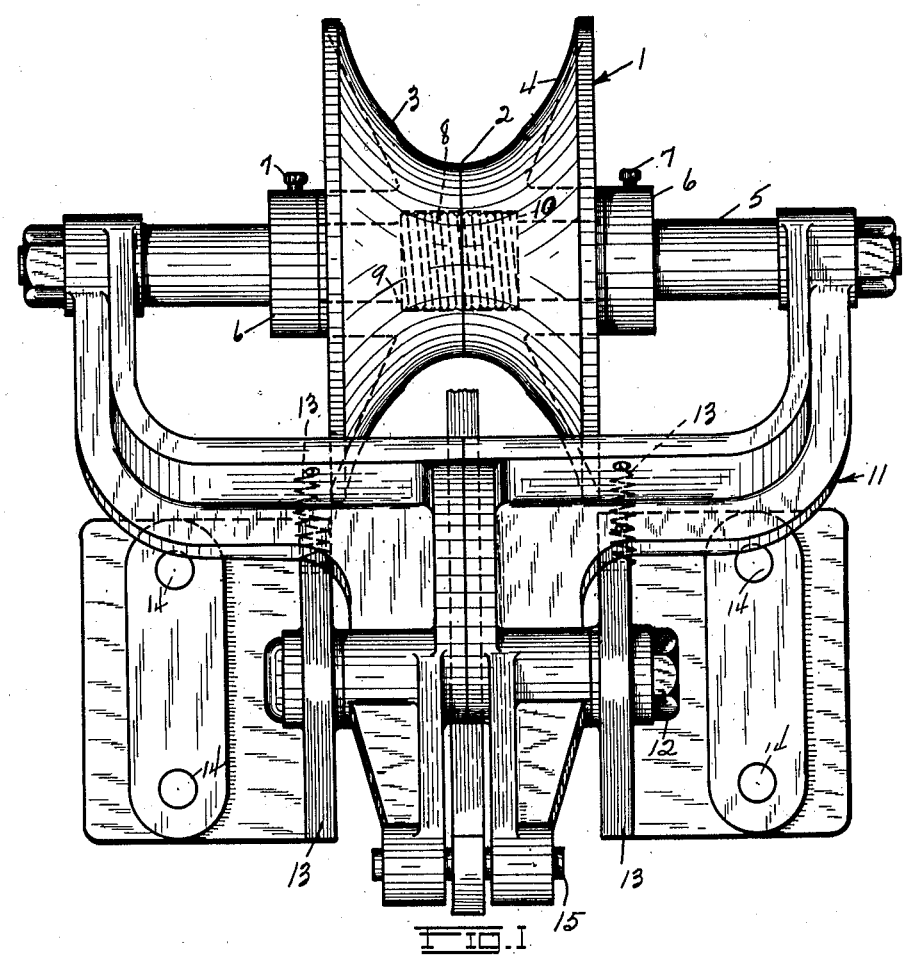
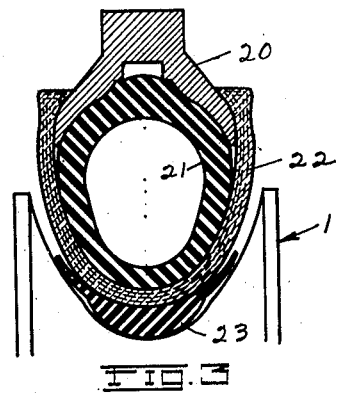
GEORGE F. WIKLE
INVENTOR
BY
ATTORNEY Feb. 25, 1930.                G. F. WIKLE                 1,748,263
                         TIRE BUILDING MACHINE
                    Filed March 19, 1924      2 Sheets-Sheet 2
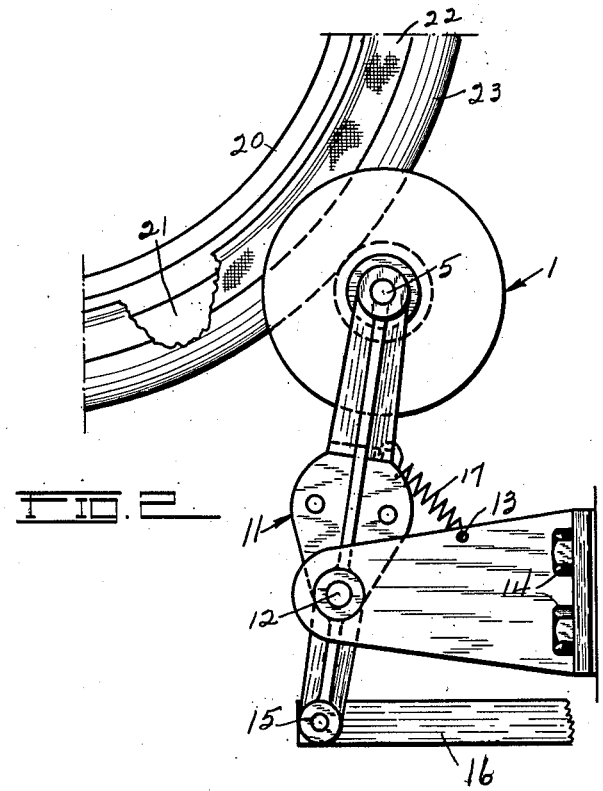
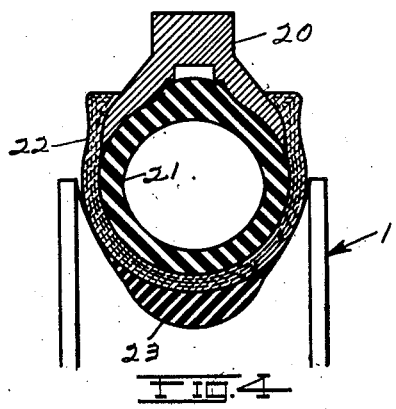
GEORGE F. WIKLE
INVENTOR
BY
ATTORNEY Patented Feb. 25, 1930

1,748,263

UNITED STATES PATENT OFFICE

GEORGE F. WIKLE, OF MILWAUKEE, WISCONSIN

TIRE-BUILDING MACHINE

Application filed March 19, 1924. Serial No. 700,396.

My invention relates to machines for building pneumatic tire casings and more particularly to a device for rolling the tread elements onto the tire carcass while the latter is on the building core.

According to the prevailing practice the various plies of fabric, square woven or the so called cord fabrics, are formed about an annular core. It has been suggested that this core may be of a pneumatic or resilient character and that the conventional air bag which is customarily inserted in the casing during vulcanization may be advantageously used as the building core. The use of such a yielding building core presents special problems and it is the object of my invention to provide a tread roll which shall be accurate and efficient in operation on cores of this type.

In the accompanying drawings which illustrate one embodiment of my invention

Figure 1 is a front elevation,

Figure 2 is a side elevation,

Figure 3 is a diagrammatic view showing the condition at the beginning of the operation, and Figure 4 is a similar view at the end of the operation.

In the drawings the tread roller is generally indicated at 1. This roller as shown is split at 2, forming two freely and independently rotatable halves 3 and 4, which are mounted on shaft 5 and held in place thereon by collars 6 adjustably secured to the shaft by set screws 7. The halves 3 and 4 are held against the collars 6 by a spring 8 encircling shaft 5 and seating against shoulders 9 and 10 formed in the members 3 and 4. As will be evident this arrangement permits adjustment of the roll 1 to accommodate various sizes of tires or variations in thread contour or thickness. It is to be noted also that the halves 3 and 4 are unyielding in the direction of the forces applied during their operation, that is, away from the sides of the tire carcass.

As clearly shown in Figure 1 the roll 1 is grooved to substantially conform to the profile of the carcass and tread.

Shaft 5 is rigidly supported in a forked lever 11 pivoted at 12 in brackets 13 secured at 14 to the frame of the building machine. The lower arms of lever 11 are connected by pin 15 to a link 16 through which roll 1 may be swung forward into operative engagement with the building core, as shown in Figure 2, against the action of springs 17 which tend to keep fork 11 and roll 1 in retracted position. Springs 17 may be connected to fork 11 and brackets 13 or any other convenient stationary part of the frame. Any suitable means may be provided for operating link 16 such as that shown in my co-pending application Serial Number 697,200, filed March 6, 1924.

As shown in Figures 2 and 3 the building core may comprise a rim 20 supporting an air bag 21 upon which the tire carcass 22 is formed. The tread rubber upon which roll 1 operates, is shown at 23. Rim 20 is conveniently formed in sections which may be retracted by any suitable means to permit removal of the tire and air bag. Any suitable means may be provided to power rotate the core, such as that shown in my co-pending application above referred to.

In the operation the tread 23 is positioned on the tire carcass, by hand or otherwise, and the core set in motion. Roll 1 is then swung forward to engage, with increasing pressure, the tread and tire carcass. Due to the fact that the curves of the roll are on a slightly larger radius than the curved surfaces of the tread and carcass, roll 1 first meets the center of the tread only, as shown in Figure 3. As the unyielding roll is pressed against the tread, the resilient core yields gradually and uniformly to the position shown in Figure 4, with the result that the tread is applied to the carcass progressively from the center of the tread outwardly. The entrapment of air and the formation of wrinkles or creases is thereby prevented and the yielding of the resilient core permits a gradual and at the same time uniform increase in pressure which reduces the tendency to distort or disturb the strain resisting elements of the tire carcass to a minimum.

While I have illustrated my invention in connection with a core comprising a conventional air bag it will be understood that my invention is not limited thereto and that any suitable form of resilient core may be employed.

I claim:

1. A device of the character described comprising a rotatable resilient core and an unyielding roll grooved to approximate the profile of a tire carcass including the tread, the curves of said groove being of a slightly longer radius than the corresponding curves of such profile.

2. A tread applying device comprising a split roll, means limiting the extent of separation of the halves of said roll and means to maintain the halves in separated position.

3. A tread applying device comprising two roll members freely rotatable upon a shaft, means on said shaft to limit the lateral movement of said roll members and a spring interposed between said members.

In testimony whereof I have signed my name to the above specification.

GEORGE F. WIKLE.